(12) United States Patent
Rytlewski et al.

(10) Patent No.: US 8,567,494 B2
(45) Date of Patent: Oct. 29, 2013

(54) WELL OPERATING ELEMENTS COMPRISING A SOLUBLE COMPONENT AND METHODS OF USE

(75) Inventors: Gary L. Rytlewski, League City, TX (US); Ashish Sharma, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1440 days.

(21) Appl. No.: 11/162,184

(22) Filed: Aug. 31, 2005

(65) Prior Publication Data

US 2007/0044958 A1 Mar. 1, 2007

(51) Int. Cl.
*E21B 49/00* (2006.01)
*E21B 33/12* (2006.01)

(52) U.S. Cl.
USPC ...... 166/250.01; 507/219; 507/221; 507/224; 507/226; 507/230; 166/192; 166/193; 166/373; 166/381

(58) Field of Classification Search
USPC ............................................ 516/77; 521/165
See application file for complete search history.

(56) References Cited

U.S. PATENT DOCUMENTS

| | | | |
|---|---|---|---|
| 2,261,292 A | 11/1941 | Salnikov | |
| 2,279,136 A | 1/1957 | Hood et al. | |
| 2,779,136 A | 1/1957 | Harrison et al. | |
| 3,106,959 A | 10/1963 | Huitt et al. | |
| 3,311,956 A | 4/1967 | Townsend et al. | |
| 3,316,748 A | 5/1967 | Lang et al. | |
| 3,938,764 A | 2/1976 | McIntyre et al. | |
| 4,157,732 A | 6/1979 | Fonner | |
| 4,270,761 A | * 6/1981 | Hertz, Jr. | 277/336 |
| 4,450,136 A | 5/1984 | Dudek et al. | |
| 4,652,274 A | 3/1987 | Boettcher et al. | |
| 4,664,816 A | 5/1987 | Walker | |
| 4,735,632 A | 4/1988 | Oxman et al. | |

(Continued)

FOREIGN PATENT DOCUMENTS

| | | |
|---|---|---|
| EP | 178334 A1 | 4/1986 |
| EP | 178334 B1 | 4/1986 |

(Continued)

OTHER PUBLICATIONS

Molyneux, Philip, "Water-soluble synthetic polymers: properties and behavior", CRC Press, 1983, 240 pages.*

(Continued)

*Primary Examiner* — John J Figueroa
(74) *Attorney, Agent, or Firm* — Jeffery R. Peterson; Brandon Clark (57) ABSTRACT

Well operating elements are described, one embodiment comprising a first component that is substantially non-dissolvable when exposed to a selected wellbore environment and a second component that is soluble in the selected wellbore environment and whose rate and/or location of dissolution is at least partially controlled by structure of the first component. A second embodiment includes the component that is soluble in the selected wellbore environment, and one or more exposure holes or passages in the soluble component to control its solubility. The second embodiment may or may not include a substantially non-dissolvable component. Methods of using the well operating elements in oilfield operations are also described. This abstract allows a searcher or other reader to quickly ascertain the subject matter of the disclosure. It will not be used to interpret or limit the scope or meaning of the claims.

23 Claims, 4 Drawing Sheets

(56) References Cited

U.S. PATENT DOCUMENTS

| | | | |
|---|---|---|---|
| 4,871,008 | A | 10/1989 | Dwivedi et al. |
| 4,903,440 | A | 2/1990 | Larson et al. |
| 4,906,523 | A | 3/1990 | Bilkadi et al. |
| 4,919,209 | A | 4/1990 | King |
| 4,923,714 | A | 5/1990 | Gibb et al. |
| 5,178,646 | A | 1/1993 | Barber, Jr. et al. |
| 5,188,183 | A | 2/1993 | Hopmann |
| 5,204,183 | A | 4/1993 | McDougall |
| 5,236,472 | A | 8/1993 | Kirk et al. |
| 5,417,285 | A | 5/1995 | Van Buskirk |
| 5,479,986 | A | 1/1996 | Gano |
| 5,566,757 | A | 10/1996 | Carpenter et al. |
| 5,765,641 | A | 6/1998 | Shy |
| 5,826,661 | A | 10/1998 | Parker |
| 6,012,526 | A | 1/2000 | Jennings et al. |
| 6,145,593 | A | 11/2000 | Hennig |
| 6,155,348 | A | 12/2000 | Todd |
| 6,162,766 | A | 12/2000 | Muir |
| 6,241,021 | B1 | 6/2001 | Bowling |
| 6,261,432 | B1 | 7/2001 | Huber et al. |
| 6,311,773 | B1 | 11/2001 | Todd et al. |
| 6,346,315 | B1 | 2/2002 | Sawatsky |
| 6,422,314 | B1 | 7/2002 | Todd et al. |
| 6,444,316 | B1 | 9/2002 | Reddy et al. |
| 6,457,525 | B1 | 10/2002 | Scott |
| 6,494,263 | B2 | 12/2002 | Todd |
| 6,527,051 | B1 | 3/2003 | Reddy et al. |
| 6,554,071 | B1 | 4/2003 | Reddy et al. |
| 6,561,270 | B1 | 5/2003 | Budde |
| 6,607,036 | B2 | 8/2003 | Ranson et al. |
| 6,632,527 | B1 | 10/2003 | McDaniel et al. |
| 6,737,385 | B2 | 5/2004 | Todd et al. |
| 6,745,159 | B1 | 6/2004 | Todd et al. |
| 6,854,522 | B2 | 2/2005 | Brezinski et al. |
| 6,866,306 | B2 | 3/2005 | Boyle et al. |
| 6,877,563 | B2 | 4/2005 | Todd et al. |
| 6,878,782 | B2 | 4/2005 | Merfeld et al. |
| 6,896,056 | B2 | 5/2005 | Mendez et al. |
| 6,896,058 | B2 | 5/2005 | Munoz, Jr. et al. |
| 6,918,445 | B2 | 7/2005 | Todd et al. |
| 6,924,254 | B2 | 8/2005 | Todd |
| 6,966,368 | B2 | 11/2005 | Farquhar |
| 6,968,898 | B2 | 11/2005 | Todd et al. |
| 6,971,448 | B2 | 12/2005 | Slabaugh et al. |
| 6,976,538 | B2 | 12/2005 | Wilson et al. |
| 6,983,798 | B2 | 1/2006 | Todd |
| 7,000,701 | B2 | 2/2006 | Todd et al. |
| 7,021,383 | B2 | 4/2006 | Todd et al. |
| 7,036,586 | B2 | 5/2006 | Roddy et al. |
| 7,036,588 | B2 | 5/2006 | Munoz, Jr. et al. |
| 7,036,687 | B1 | 5/2006 | Lowe |
| 7,044,220 | B2 | 5/2006 | Nguyen et al. |
| 7,285,772 | B2 | 10/2007 | Labous et al. |
| 7,322,412 | B2 | 1/2008 | Badalamenti et al. |
| 7,322,417 | B2 * | 1/2008 | Rytlewski et al. ............ 166/313 |
| 7,353,867 | B2 | 4/2008 | Carter et al. |
| 8,220,554 | B2 | 7/2012 | Jordan et al. |
| 2003/0116608 | A1 | 6/2003 | Litwinski |
| 2003/0150614 | A1 | 8/2003 | Brown et al. |
| 2003/0224165 | A1 | 12/2003 | Anderson et al. |
| 2004/0043906 | A1 | 3/2004 | Heath et al. |
| 2004/0188090 | A1 | 9/2004 | Vaeth et al. |
| 2005/0145381 | A1 | 7/2005 | Pollard |
| 2005/0161222 | A1 | 7/2005 | Haugen et al. |
| 2005/0173126 | A1 | 8/2005 | Starr et al. |
| 2005/0194141 | A1 | 9/2005 | Sinclair et al. |
| 2005/0205264 | A1 | 9/2005 | Starr et al. |
| 2005/0205265 | A1 | 9/2005 | Todd et al. |
| 2005/0205266 | A1 | 9/2005 | Todd et al. |
| 2005/0241824 | A1 | 11/2005 | Burris, II et al. |
| 2005/0241825 | A1 | 11/2005 | Burris et al. |
| 2005/0241835 | A1 | 11/2005 | Burris, II et al. |
| 2005/0269083 | A1 | 12/2005 | Burris, II et al. |
| 2006/0027359 | A1 | 2/2006 | Carter et al. |
| 2006/0035074 | A1 * | 2/2006 | Taylor ........................ 428/339 |
| 2006/0037759 | A1 | 2/2006 | Braddick |
| 2006/0042835 | A1 | 3/2006 | Guerrero et al. |
| 2006/0175059 | A1 * | 8/2006 | Sinclair et al. ............... 166/283 |
| 2006/0207771 | A1 | 9/2006 | Rios, III et al. |
| 2006/0249310 | A1 | 11/2006 | Stowe et al. |
| 2006/0266551 | A1 | 11/2006 | Yang et al. |
| 2007/0034384 | A1 | 2/2007 | Pratt |
| 2007/0044958 | A1 | 3/2007 | Rytlewski et al. |
| 2007/0107908 | A1 | 5/2007 | Vaidya et al. |
| 2007/0181224 | A1 | 8/2007 | Marya et al. |
| 2008/0018230 | A1 | 1/2008 | Yamada et al. |
| 2008/0079485 | A1 | 4/2008 | Taipale et al. |
| 2008/0105438 | A1 | 5/2008 | Jordan et al. |
| 2008/0149345 | A1 | 6/2008 | Marya et al. |
| 2008/0149351 | A1 | 6/2008 | Marya et al. |

FOREIGN PATENT DOCUMENTS

| | | | |
|---|---|---|---|
| EP | 1605281 A1 | 12/2005 | |
| EP | 1605281 B1 | 5/2006 | |
| GB | 666281 A | 2/1952 | |
| GB | 1187305 A | 4/1970 | |
| GB | 2386627 A | 9/2003 | |
| JP | 11264042 A | 9/1999 | |
| JP | 2002161325 A | 6/2002 | |
| RU | 2073696 C1 | 2/1997 | |
| WO | 0248503 A1 | 6/2002 | |
| WO | WO-2005/090742 A1 | 9/2005 | |
| WO | 2006023172 A2 | 3/2006 | |
| WO | 2008079485 A2 | 7/2008 | |

OTHER PUBLICATIONS

Thomson, D.W. and Nazroo, M.F.; "Design and Installation of a Cost-Effective Completion System for Horizontal Chalk Wells Where Multiple Zones Require Acid Stimulation"; Offshore Technology Conference, May 1997, Houston, Texas; SPE 51177 (a revision of SPE 39150).

Anonymous, "Degrade: Definition, Synonyms," from Answers.com, retrieved May 11, 2011, <http://www.answers.com/topic/degrade>.

Search Report issued in PCT/US2008/082713 on Mar. 13, 2009.

\* cited by examiner

FIG. 7A    FIG. 7B    FIG. 8

WELL OPERATING ELEMENTS COMPRISING A SOLUBLE COMPONENT AND METHODS OF USE

BACKGROUND OF THE INVENTION

1. Field of Invention

The present invention relates generally to the field of oilfield exploration, production, and testing, and more specifically to well operating elements and methods of using same.

2. Related Art

A diverter ball is a ball that is dropped or pumped through wellbore tubulars in a process known as diversion, and used during acidizing and fracturing operations. One common method of fracturing wells is to have a multitude of perforations open in the well that are exposed to the fracturing pressure being pumped into the well bore. The formation will begin to fracture behind a few of the perforations and the majority of the fracturing fluid will flow through these few perforations. Typically, initiating fractures requires more pressure then continuing an existing fracture so diverter balls are used to divert flow to other perforations. A percentage of diverter balls compared to the total number of perforations are dropped in a well (as an example, 10 balls are dropped at a time in a well with 100 perforations) and the balls theoretically will plug off the perforations which are taking the majority of flow because the flow is carrying the balls. Once the diverter balls are plugging the flowing perforations, the well bore pressure will increase until new fractures are started behind other perforations. More diverter balls are dropped until the majority of all of the perforated intervals are fractured. In other well operations, balls are used that function to open and close downhole valves in different fracturing zones, and may serve as temporary plugs to zones below the ball. In this sense the term balls includes bars, plugs, darts, and other shaped members, and are more generally referred to herein as well operating elements.

Diverter balls and fracturing elements are typically flowed to the surface or dropped to the bottom of the wellbore when their use is completed. If they are not degradable in the wellbore environment, there is a disincentive to their use. Dissolvable diverter balls are known in diversion operations, however, their rate or location of dissolution is not controlled. In a diversion process, a ball, dart, or other non-dissolvable fracturing element may land on a seat and be positioned effectively to divert fracturing fluid, acids, and/or proppants outwardly through crossover ports for flow through the annulus into the formation adjacent a perforated casing section. Multiple small dissolvable diverter balls are then flowed in to the tubing, typically with the fracturing fluid, and seat on perforations in the casing to divert fracturing fluids, acids, and proppants from a high flow area of perforations to a low flow area so that the low flow area receives the treatment fluid. Eventually the dissolvable material degrades, whether from mechanical action, contact with a fluid, heat, or combination thereof, or before dissolving they are pumped to the surface with well fluids, or dropped to the bottom of the wellbore.

It would be desirable in many well operations to have well operating elements that controllably dissolve either in rate of dissolution, location of the element, or both (or include a portion that controllably dissolves) in the wellbore environment, without having to resort to highly acid conditions, high temperatures, and mechanical milling. Elastomeric drop balls are known, as well as balls composed of epoxy resin cores with suitable light- and heavy-weight fillers to achieve the desired specific gravity expected in a well fluid. Filled epoxy resin balls may be coated or overmolded with nitrile or fluorocarbon rubber. These materials are purposely made non-degradable in a wellbore environment and their removal requires milling, extreme acidity, high temperatures, or some combination thereof, all of which involve considerable expense and safety issues.

None of the known drop balls, diverter balls, and the like have the ability to dissolve in a controlled fashion, and there is a need in the art for such an item, particularly an item that has both dissolvable components and non-dissolvable components, the latter retrievable from the wellbore, or degradable under user defined conditions.

SUMMARY OF THE INVENTION

In accordance with the present invention, apparatus and methods of making and using same are described that reduce or overcome problems in previously known apparatus and methods. By combining the properties of soluble polymers with relatively insoluble materials, such as water-insoluble polymers, ceramics, and combinations thereof, the materials act together to provide uniquely useful well operating elements. The well operating elements of the invention may be useful or any of a multitude of purposes including, but not limited to, opening completion valves and sealing off lower layers during fracturing operations. When a relatively cool fracturing fluid is pumped into the well during fracturing the area near the completion valve will be cooled as well. A well operating element of the invention that dissolves at or about reservoir temperature would remain solid at the cooled downhole fracturing temperature. This is desirable during fracturing operations although the invention is not so limited as the well operating element is then able to shift a completion valve and plug of any fracturing fluid from passing below the completion valve for a period of time needed to fracture the layer above the completion valve. The well operating element is then allowed to warm up to the reservoir temperature at the layer where fracturing is taking place, allowing degradation of a portion of the element. When the fracturing operation moves uphole to the next layer to be fractured the well operating element of the invention falls to a wellbore position at an even warmer temperature, thus enabling the remainder of the element to degrade and fall to the bottom of the well. No intervention is needed to remove the element after it's useful life of diverting the flow is completed. Alternatively, the remainder of the element may be pumped to the surface.

A first aspect of the invention are well operating elements comprising:

a first component that is substantially non-dissolvable when exposed to a selected wellbore environment; and a second component that is soluble in the selected wellbore environment and whose rate and/or location of dissolution is at least partially controlled by structure of the first component.

The first component functions to limit dissolution of the second component by limiting either the rate, location (i.e., front, back, center or some other location of the element), or both rate and location of dissolution of the second material. The first component also serves to distribute loads at high stress areas, such as at a ball seat. Also, the first component is capable of a wider temperature characteristic compared to the more soluble second component such that it is not subject to excessive degradation at extreme temperature by comparison. The first component may be structured in many ways to control degradation of the second component. For example, the first component may comprise a coating, covering, or sheath upon a portion of or an entire outer surface of the second component, or the first component many comprise one or more elements embedded into a mass of the second component. The first component may comprise a shape and a composition allowing the first component to be brought outside of the wellbore by a flowing fluid, such as by pumping, or by reservoir pressure. The first component may be selected from polymeric materials, metals that do not melt in wellbore environments, materials soluble in acidic compositions, frangible ceramic materials, and composites. The first component may include fillers and other ingredients as long as those ingredients are degradable by similar mechanisms. Suitable polymeric materials for the first composition include natural polymers, synthetic polymers, blends of natural and synthetic polymers, and layered versions of polymers, wherein individual layers may be the same or different in composition and thickness. The term "polymeric material" includes composite polymeric materials, such as, but not limited to, polymeric materials having fillers, plasticizers, and fibers therein. Suitable synthetic polymeric materials include those selected from thermoset polymers and non-thermoset polymers. Examples of suitable non-thermoset polymers include thermoplastic polymers, such as polyolefins, polytetrafluoroethylene, polychlorotrifluoroethylene, and thermoplastic elastomers.

The second component functions to dissolve when exposed to the wellbore conditions in a user controlled fashion, i.e., at a rate and location controlled by the structure of the first component. In this way, zones in a wellbore, or the wellbore itself or branches of the wellbore, may be blocked for periods of time uniquely defined by the user. The second component may comprise a water-soluble inorganic material, a water-soluble organic material, and combinations thereof. The water-soluble organic material may comprise a water-soluble polymeric material, for example, but not limited to poly(vinyl alcohol), poly(lactic acid), and the like. The water-soluble polymeric material may either be a normally water-insoluble polymer that is made soluble by hydrolysis of side chains, or the main polymeric chain may be hydrolysable.

An alternative well fracturing component of the invention comprises a soluble component that is soluble when exposed to a selected wellbore environment, the soluble component including one or more exposure passages or holes to at least partially control dissolution of the soluble component. These well operating element embodiments may or may not have any non-soluble component. A portion of the well operating element that is to seat on a valve seat or other seating may have a non-dissolvable component, such as an end cap, and the like. In certain embodiments, the non-dissolvable component may comprise a shaped object, such as a collet, that provides shape and support for the soluble component.

Optionally, the first component outer surface may have thereon a protective polymeric coating, which may be a conformal coating such as a Parylene coating, a thermoset polymeric coating, a thermoplastic coating, and combinations thereof.

The well operating elements of the invention may have a number of shapes, as long as the element is able to traverse at least a portion of a wellbore and block off a perforation, or a portion of a wellbore as a wellbore plug, or to actuate (open or close) a downhole valve. Suitable shapes include cylindrical, round, bar shapes, dart shapes and the like. A dart shape means that the bottom has a tapered end, in some cases pointed. Well operating elements of the invention will generally have first and second ends that may be tapered in shape to contribute to the ease of the element traversing through a wellbore. The first and second components may or may not have the same basic shape. For example, if the first component comprises a coating, covering, or sheath entirely covering the second component, the shapes of the first and second components will be very similar. In these embodiments, the first component will comprise one or more passages to allow well fluids or injected fluids to contact the second component. Since the diameter, length, and shape of the passages through the first component are controllable, the rate of dissolution of the second component may be controlled solely by mechanical manipulation of the passages. In addition, the one or more passages may extend into the second component a variable distance, diameter, and/or shape as desired to control the rate of dissolution of the second component. The rate of dissolution is also controllable chemically by choice of composition of the second material. The well operating element may comprise a structure wherein the first component comprises a plurality of strips of the first material embedded in an outer surface of the second component, or some other shaped element embedded into the second component, such as a collet embedded in the second component. In other well operating elements of the invention, the first component may comprise a plurality of strips or other shapes of the first component adhered to an outer surface of the second component.

Yet another aspect of the invention are methods of using a well operating element of the invention in performing an oilfield operation, such as fracturing and acidizing, one method comprising:

(a) determining environmental conditions of a wellbore zone;

(b) selecting a well operating element of the invention depending on the environmental conditions at the wellbore zone to be treated; and (c) using the well operating element in an oilfield operation in the environmental conditions at the wellbore zone.

Methods of the invention may include, but are not limited to, running one or more sensors into a wellbore using one or more surface oilfield elements in order to determine the environmental conditions of the wellbore at least where the well operating element is to be positioned; and/or retrieving the non-dissolvable first component from the wellbore after using it, or degrading the first component in the wellbore by application of acid, heat, or by breaking it up as a frangible material. The environmental conditions of the wellbore during running and retrieving may be the same or different from the environmental conditions during use in the wellbore or at the surface. Methods of the invention include those comprising using the first well operating element to close a first completion valve positioned just below a first wellbore zone to be treated, and cooling the first well operating element using a completion fluid having a temperature lower than a temperature of the first wellbore zone. A second well operating element may then be used to close a second completion valve positioned above the first completion valve and just below a second wellbore zone to be treated, allowing the first well operating element to reach the temperature of the first wellbore zone. The may be repeated multiple times for as many zones that need to be treated.

The various aspects of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The invention describes well operating elements useful in oilfield applications, including exploration, drilling, and production activities. As used herein the term "oilfield" includes land based (surface and sub-surface) and sub-seabed applications, and in certain instances seawater applications, such as when exploration, drilling, or production equipment is deployed through seawater. The term "oilfield" as used herein includes oil and gas reservoirs, and formations or portions of formations where oil and gas are expected but may ultimately only contain water, brine, or some other composition.

A "well operating element" is an element that is useful in a well operation. Well operations include, but are not limited to, well stimulation operations, such as hydraulic fracturing, acidizing, acid fracturing, fracture acidizing, or any other well treatment, whether or not performed to restore or enhance the productivity of a well. Stimulation treatments fall into two main groups, hydraulic fracturing treatments and matrix treatments. Fracturing treatments are performed above the fracture pressure of the reservoir formation and create a highly conductive flow path between the reservoir and the wellbore. Matrix treatments are performed below the reservoir fracture pressure and generally are designed to restore the natural permeability of the reservoir following damage to the near-wellbore area.

Hydraulic fracturing, in the context of well workover and intervention operations, is a stimulation treatment routinely performed on oil and gas wells in low-permeability reservoirs. Specially engineered fluids are pumped at high pressure and rate into the reservoir interval to be treated, causing a vertical fracture to open. The wings of the fracture extend away from the wellbore in opposing directions according to the natural stresses within the formation. Proppant, such as grains of sand of a particular size, is mixed with the treatment fluid keep the fracture open when the treatment is complete. Hydraulic fracturing creates high-conductivity communication with a large area of formation and bypasses any damage that may exist in the near-wellbore area.

In the context of well testing, hydraulic fracturing means the process of pumping into a closed wellbore with powerful hydraulic pumps to create enough downhole pressure to crack or fracture the formation. This allows injection of proppant into the formation, thereby creating a plane of high-permeability sand through which fluids can flow. The proppant remains in place once the hydraulic pressure is removed and therefore props open the fracture and enhances flow into the wellbore.

Acidizing means the pumping of acid into the wellbore to remove near-well formation damage and other damaging substances. This procedure commonly enhances production by increasing the effective well radius. When performed at pressures above the pressure required to fracture the formation, the procedure is often referred to as acid fracturing. Fracture acidizing is a procedure for production enhancement, in which acid, usually hydrochloric (HCl), is injected into a carbonate formation at a pressure above the formation-fracturing pressure. Flowing acid tends to etch the fracture faces in a nonuniform pattern, forming conductive channels that remain open without a propping agent after the fracture closes. The length of the etched fracture limits the effectiveness of an acid-fracture treatment. The fracture length depends on acid leakoff and acid spending. If acid fluid-loss characteristics are poor, excessive leakoff will terminate fracture extension. Similarly, if the acid spends too rapidly, the etched portion of the fracture will be too short. The major problem in fracture acidizing is the development of wormholes in the fracture face; these wormholes increase the reactive surface area and cause excessive leakoff and rapid spending of the acid. To some extent, this problem can be overcome by using inert fluid-loss additives to bridge wormholes or by using viscosified acids. Fracture acidizing is also called acid fracturing or acid-fracture treatment.

A "wellbore" may be any type of well, including, but not limited to, a producing well, a non-producing well, an injection well, a fluid disposal well, an experimental well, an exploratory well, and the like. Wellbores may be vertical, horizontal, deviated some angle between vertical and horizontal, and combinations thereof, for example a vertical well with a non-vertical component.

First Component

The first component functions to limit dissolution of the second component by limiting either the rate, location (i.e., front, back, center or some other location of the element), or both rate and location of dissolution of the second material. The first component also serves to distribute loads at high stress areas, such as at a ball seat. Also, the first component is capable of a wider temperature characteristic compared to the more soluble second component such that it is not subject to excessive degradation at extreme temperature by comparison. The first component provides structural integrity to the well operating element, both during its use, as well as for pumping out the element, if that is desired. Materials useful in the invention as the first component are not water-soluble, and are resistant to weak acid, hydrocarbons, brine, and other produced or injected well fluids. The first component may be selected from polymeric materials, metals that do not melt in wellbore environments, materials soluble over time in strongly acidic compositions, frangible ceramic materials, and composites of these. Regarding acid resistance, the first component materials may be resistant to weak acidic compositions (pH ranging from about 5 to 7) for lengthy time periods, for example days, weeks, months, and even years, but resistant to strongly acidic compositions having pH ranging from about 2 to about 5, for relatively shorter time periods, for example weeks, days, or even hours, depending on operator preference and the particular oilfield operation to be carried out. The first component may include fillers and other ingredients as long as those ingredients are degradable by similar mechanisms, or of non-degradable, are able to be removed from the wellbore, or left in the wellbore if relatively inert to the environment.

Suitable polymeric materials for the first composition include natural polymers, synthetic polymers, blends of natural and synthetic polymers, and layered versions of polymers, wherein individual layers may be the same or different in composition and thickness. The term "polymeric material" includes composite polymeric materials, such as, but not limited to, polymeric materials having fillers, plasticizers, and fibers therein. Suitable synthetic polymeric materials include those selected from thermoset polymers and non-thermoset polymers. Examples of suitable non-thermoset polymers include thermoplastic polymers, such as polyolefins, polytetrafluoroethylene, polychlorotrifluoroethylene, and thermoplastic elastomers. The term "polymeric material" includes composite polymeric materials, such as, but not limited to, polymeric materials having fillers, plasticizers, and fibers therein.

One class of useful materials for the first component are the elastomers. "Elastomer" as used herein is a generic term for substances emulating natural rubber in that they stretch under tension, have a high tensile strength, retract rapidly, and substantially recover their original dimensions. The term includes natural and man-made elastomers, and the elastomer may be a thermoplastic elastomer or a non-thermoplastic elastomer. The term includes blends (physical mixtures) of elastomers, as well as copolymers, terpolymers, and multipolymers. Useful elastomers may also include one or more additives, fillers, plasticizers, and the like.

Suitable examples of useable fluoroelastomers are copolymers of vinylidene fluoride and hexafluoropropylene and terpolymers of vinylidene fluoride, hexafluoropropylene and tetrafluoroethylene. The fluoroelastomers suitable for use in the disclosed invention are elastomers that comprise one or more vinylidene fluoride units ($VF_2$ or VdF), one or more hexafluoropropylene units (HFP), one or more tetrafluoroethylene units (TFE), one or more chlorotrifluoroethylene (CTFE) units, and/or one or more perfluoro(alkyl vinyl ether) units (PAVE) such as perfluoro(methyl vinyl ether)(PMVE), perfluoro(ethyl vinyl ether)(PEVE), and perfluoro(propyl vinyl ether)(PPVE). These elastomers can be homopolymers or copolymers. Particularly suitable are fluoroelastomers containing vinylidene fluoride units, hexafluoropropylene units, and, optionally, tetrafluoroethylene units and fluoroelastomers containing vinylidene fluoride units, perfluoroalkyl perfluorovinyl ether units, and tetrafluoroethylene units, such as the vinylidene fluoride type fluoroelastomers known under the trade designation Aflas®, available from Asahi Glass Co., Ltd. The elastomers known under the trade designation Aflas® are vinylidene fluoride type fluoroelastomers. Especially suitable are copolymers of vinylidene fluoride and hexafluoropropylene units. If the fluoropolymers contain vinylidene fluoride units, preferably the polymers contain up to 40 molepercent $VF_2$ units, e.g., 30-40 molepercent. If the fluoropolymers contain hexafluoropropylene units, preferably the polymers contain up to 70 mole percent HFP units. If the fluoropolymers contain tetrafluoroethylene units, preferably the polymers contain up to 10 mole percent TFE units. When the fluoropolymers contain chlorotrifluoroethylene preferably the polymers contain up to 10 mole percent CTFE units. When the fluoropolymers contain perfluoro(methyl vinyl ether) units, preferably the polymers contain up to 5 mole percent PMVE units. When the fluoropolymers contain perfluoro(ethyl vinyl ether) units, preferably the polymers contain up to 5 mole percent PEVE units. When the fluoropolymers contain perfluoro(propyl vinyl ether) units, preferably the polymers contain up to 5 mole percent PPVE units. The fluoropolymers preferably contain 66 percent-70 percent fluorine. One suitable commercially available fluoroelastomer is that known under the trade designation Technoflon FOR HS® sold by Ausimont USA. This material contains Bisphenol AF, manufactured by Halocarbon Products Corp. Another commercially available fluoroelastomer is known under the trade designation Viton® AL 200, by DuPont Dow, which is a terpolymer of $VF_2$, HFP, and TFE monomers containing 67 percent fluorine. Another suitable commercially available fluoroelastomer is Viton® AL 300, by DuPont Dow. A blend of the terpolymers known under the trade designations Viton® AL 300 and Viton® AL 600 can also be used (e.g., one-third AL-600 and two-thirds AL-300).

Thermoplastic elastomers are generally the reaction product of a low equivalent molecular weight polyfunctional monomer and a high equivalent molecular weight polyfunctional monomer, wherein the low equivalent weight polyfunctional monomer is capable, on polymerization, of forming a hard segment (and, in conjunction with other hard segments, crystalline hard regions or domains) and the high equivalent weight polyfunctional monomer is capable, on polymerization, of producing soft, flexible chains connecting the hard regions or domains.

"Thermoplastic elastomers" differ from "thermoplastics" and "elastomers" in that thermoplastic elastomers, upon heating above the melting temperature of the hard regions, form a homogeneous melt which can be processed by thermoplastic techniques (unlike elastomers), such as injection molding, extrusion, blow molding, and the like. Subsequent cooling leads again to segregation of hard and soft regions resulting in a material having elastomeric properties, however, which does not occur with thermoplastics. Commercially available thermoplastic elastomers include segmented polyester thermoplastic elastomers, segmented polyurethane thermoplastic elastomers, segmented polyamide thermoplastic elastomers, blends of thermoplastic elastomers and thermoplastic polymers, and ionomeric thermoplastic elastomers.

"Segmented thermoplastic elastomer", as used herein, refers to the sub-class of thermoplastic elastomers which are based on polymers which are the reaction product of a high equivalent weight polyfunctional monomer and a low equivalent weight polyfunctional monomer.

"Ionomeric thermoplastic elastomers" refers to a sub-class of thermoplastic elastomers based on ionic polymers (ionomers). Ionomeric thermoplastic elastomers are composed of two or more flexible polymeric chains bound together at a plurality of positions by ionic associations or clusters. The ionomers are typically prepared by copolymerization of a functionalized monomer with an olefinic unsaturated monomer, or direct functionalization of a preformed polymer. Carboxyl-functionalized ionomers are obtained by direct copolymerization of acrylic or methacrylic acid with ethylene, styrene and similar comonomers by free-radical copolymerization. The resulting copolymer is generally available as the free acid, which can be neutralized to the degree desired with metal hydroxides, metal acetates, and similar salts.

Another useful class of polymeric materials for use in the first component are thermoplastic materials. A thermoplastic material is defined as a polymeric material (preferably, an organic polymeric material) that softens and melts when exposed to elevated temperatures and generally returns to its original condition, i.e., its original physical state, when cooled to ambient temperatures. During the manufacturing process of a well operating element, the thermoplastic material may be heated above its softening temperature, and preferably above its melting temperature, to cause it to flow and form the desired shape of the first component. After the desired shape is formed, the thermoplastic substrate is cooled and solidified. In this way, thermoplastic materials (including thermoplastic elastomers) can be molded into various shapes and sizes.

Thermoplastic materials may be preferred over other types of polymeric materials at least because the product has advantageous properties, and the manufacturing process for the preparation of well operating elements may be more efficient. For example, an oilfield element formed from a thermoplastic material is generally less brittle and less hygroscopic than an element formed from a thermosetting material. Furthermore, as compared to a process that would use a thermosetting resin, a process that uses a thermoplastic material may require fewer processing steps, fewer organic solvents, and fewer materials, e.g., catalysts. Also, with a thermoplastic material, standard molding techniques such as injection molding can be used. This can reduce the amount of materials wasted in construction.

Moldable thermoplastic materials that may be used are those having a high melting temperature, good heat resistant properties, and good toughness properties such that the oilfield element or assemblies containing these materials operably withstand oilfield conditions without substantially deforming or disintegrating. The toughness of the thermoplastic material can be measured by impact strength. Preferably, the thermoplastic material has a Gardner Impact value of at least about 0.4 Joules for a 0.89 mm thick sample under ambient conditions. More preferably, the "tough" thermoplastic materials that may be used in the oilfield elements of the present invention may have a Gardner Impact value of at least about 0.9 Joules, and most preferably at least about 1.6 Joules, for a 0.89 mm thick sample under ambient conditions.

First components comprising a thermoplastic polymer useful in the invention may withstand a temperature of at least about 200° C., or at least about 300° C., and a pressure of at least about 7 kg/cm$^2$, or at least about 13.4 kg/cm$^2$, at the point of impact of the material, which may be a seating position in a perforation or wellbore valve. Additionally, the melting temperature of the tough, heat resistant, thermoplastic material should be sufficiently lower, i.e., at least about 25° C. lower, than the melting temperature of any fibrous reinforcing material, and sufficiently higher than the melting temperature of any thermoplastic coating materials to be applied by fluidized bed dip coating. In this way, reinforcing material (if used) is not adversely affected during the molding of the thermoplastic substrate, and the first component will not melt when a thermoplastic coating is applied by dip coating, if desired. Furthermore, the thermoplastic material, if used, should be sufficiently compatible with the material used as the second component such that the first component does not deteriorate, and such that there is effective adherence of the second component to the first component.

Examples of thermoplastic materials suitable for use in first components according to the present invention include polycarbonates, polyetherimides, polyesters, polysulfones, polystyrenes, acrylonitrile-butadiene-styrene block copolymers, acetal polymers, polyamides, or combinations thereof Of this list, polyamides and polyesters may provide better performance. Polyamide materials are useful at least because they are inherently tough and heat resistant, typically provide good adhesion to coatings without priming, and are relatively inexpensive. Polyamide resin materials may be characterized by having an amide group, i.e., —C(O)NH—. Various types of polyamide resin materials, i.e., nylons, can be used, such as nylon 6/6 or nylon 6. Of these, nylon 6 may be used if a phenolic-based coating is used because of the excellent adhesion between nylon 6 and phenolic-based coatings. Nylon 6/6 is a condensation product of adipic acid and hexamethylenediamine. Nylon 6/6 has a melting point of about 264° C. and a tensile strength of about 770 kg/cm$^2$. Nylon 6 is a polymer of ε-caprolactam. Nylon 6 has a melting point of about 223° C. and a tensile strength of about 700 kg/cm$^2$. Examples of commercially available nylon resins useable as first components in oilfield elements according to the present invention include those known under the trade designations "Vydyne" from Solutia, St. Louis, Mo.; "Zytel" and "Minion" both from DuPont, Wilmington, Del.; "Trogamid T" from Degussa Corporation, Parsippany, N.J.; "Capron" from BASF, Florham Park, N.J.; "Nydur" from Mobay, Inc., Pittsburgh, Pa.; and "Ultramid" from BASF Corp., Parsippany, N.J. Mineral-filled thermoplastic materials can be used, such as the mineral-filled nylon 6 resin "Minlon", from DuPont.

Suitable thermoset (thermally cured) polymers for use in first components in the present invention include those known in the thermoset molding art. Thermoset molding compositions are generally thermosetting resins containing inorganic fillers and/or fibers. Upon heating, thermoset monomers initially exhibit viscosities low enough to allow for melt processing and molding of an article from the filled monomer composition. Upon further heating, the thermosetting monomers react and cure to form hard resins with high stiffness. Thermoset polymeric substrates useful in the invention may be manufactured by any method known in the art. These methods include, but are not limited to, reaction injection molding, resin transfer molding, and other processes wherein dry fiber reinforcement plys (preforms) are loaded in a mold cavity whose surfaces define the ultimate configuration of the article to be fabricated, whereupon a flowable resin is injected, or vacuumed, under pressure into the mold cavity (mold plenum) thereby to produce the article, or to saturate/wet the fiber reinforcement preforms, where provided. After the resinated preforms are cured in the mold plenum, the finished article is removed from the mold. As one non-limiting example of a useable thermosettable polymer precursor composition, U.S. Pat. No. 6,878,782 discloses a curable composition including a functionalized poly(arylene ether); an alkenyl aromatic monomer; an acryloyl monomer; and a polymeric additive having a glass transition temperature less than or equal to 100° C., and a Young's modulus less than or equal to 1000 megapascals at 25° C. The polymeric additive is soluble in the combined functionalized poly(arylene ether), alkenyl aromatic monomer, and acryloyl monomer at a temperature less than or equal to 50° C. The composition exhibits low shrinkage on curing and improved surface smoothness. It is useful, for example, in the manufacture of sucker rods.

Materials susceptible to attack by strongly acidic compositions may be useful materials in the first component, as long as they can be used in the well environment for at least the time required to divert fracturing fluids. Ionomers, polyamides, polyolefins, and polycarbonates, for example, may be attacked by strong oxidizing acids, but are relatively inert to weak acids. Depending on the chemical composition and shape of the first material, its thickness, the temperature in the wellbore, and the composition of the well and injected fluids, including the pH, the rate of decomposition of the first component may be controlled.

Frangible ceramic materials useful as first component materials include chemically strengthened ceramics of the type known as "Pyroceram" marketed by Corning Glass Works of Corning, N.Y. and used for ceramic stove tops. This is made by replacing lighter sodium ions with heavier potassium ions in a hardening bath, resulting in prestressed compression on the surface (up to about 0.010 inch thickness) and tension on the inner part. One example of how this is done is set forth in U.S. Pat. No. 2,779,136, assigned to Corning Glass Works. As explained in U.S. Pat. No. 3,938,764, assigned to McDonnell Douglas Corporation, such material normally had been used for anti-chipping purposes such as in coating surfaces of appliances, however, it was discovered that upon impact of a highly concentrated load at any point with a force sufficient to penetrate the surface compression layer, the frangible ceramic will break instantaneously and completely into small pieces over the entire part. If a frangible ceramic is used for the first material in the first component, a coating or coatings such as described in U.S. Pat. No. 6,346, 315 might be employed to protect the frangible ceramic during transport or handling of the inventive well operating elements. The '615 patent describes house wares, including frangible ceramic dishes and drinking glasses coated with a protective plastic coating, usually including an initial adhesion-promoting silane, and a coating of urethane, such as a high temperature urethane to give protection to the underlying layers, and to the article, including protection within a commercial dishwasher. The silane combines with glass, and couples strongly with urethane. The urethane is highly receptive to decoration, which may be transferred or printed onto the urethane surface, and this may be useful to apply bar coding, patent numbers, trademarks, or other identifying information to the inventive well operating elements. The high temperature urethane outer coating may be a thermosetting urethane, capable of withstanding temperatures as high as about 400° F. With the capability of selectively varying the respective thicknesses of the urethane coating/coatings, a range of desired characteristics, of resistance to chemicals, abrasion and impact for the well operating element can be provided, as discussed in the 615 patent.

Whatever the composition of the first component, a protective coating may be applied, as mentioned with respect to frangible ceramic first components. The coating, if used, is also generally responsible for adhering itself to the first and second components, however the invention is not so limited "Coating" as used herein as a noun, means a condensed phase formed by any one or more processes. The coating may be conformal (i.e., the coating conforms to the surfaces of the polymeric substrate), although this may not be necessary in all oilfield applications or all well operating elements, or on all surfaces of the first component or any exposed portions of the second component. Conformal coatings based on urethane, acrylic, silicone, and epoxy chemistries are known, primarily in the electronics and computer industries (printed circuit boards, for example). Another useful conformal coating includes those formed by vaporization or sublimation of, and subsequent pyrolization and condensation of monomers or dimers and polymerized to form a continuous polymer film, such as the class of polymeric coatings based on p-xylylene and its derivatives, commonly known as Parylene. Parylene coatings may be formed by vaporization or sublimation of a dimer of p-xylylene or a substituted version (for example chloro- or dichloro-p-xylylene), and subsequent pyrolization and condensation of the formed divalent radicals to form a Parylene polymer, although the vaporization is not strictly necessary.

Another class of useful polymeric coatings are thermally curable coatings derived from coatable, thermally curable coating precursor solutions, such a those described in U.S. Pat. No. 5,178,646, incorporated by reference herein.

Another class of useful coatings are addition polymerizable resins, wherein the addition polymerizable resins are derived from a polymer precursor which polymerizes upon exposure to a non-thermal energy source which aids in the initiation of the polymerization or curing process. Examples of non-thermal energy sources include electron beam, ultraviolet light, and visible light. Addition polymerizable resins are readily cured by exposure to radiation energy. Addition polymerizable resins can polymerize through a cationic mechanism or a free radical mechanism. Depending upon the energy source that is utilized and the polymer precursor chemistry, a curing agent, initiator, or catalyst may be used to help initiate the polymerization.

Examples of useful addition polymerizable resins include acrylated urethanes; acrylated epoxies; ethylenically unsaturated compounds; aminoplast derivatives having pendant unsaturated carbonyl groups; isocyanurate derivatives having at least one pendant acrylate group; isocyanate derivatives having at least one pendant acrylate group; vinyl ethers; epoxy resins; and mixtures and combinations thereof. Acrylated urethanes are diacrylate esters of hydroxy-terminated, isocyanate (NCO) extended polyesters or polyethers. The term "acrylate" encompasses acrylates and methacrylates. Examples of commercially available acrylated urethanes include those known under the trade designations "UVITHANE 782", available from Morton Thiokol Chemical, and "CMD 6600", "CMD 8400", and "CMD 8805", available from Radcure Specialties. Acrylated epoxies are diacrylate esters of epoxy resins, such as the diacrylate esters of Bisphenol A epoxy resin. Examples of commercially available acrylated epoxies include those known under the trade designations "CMD 3500", "CMD 3600", and "CMD 3700", available from Radcure Specialties.

Ethylenically unsaturated resins include both monomeric and polymeric compounds that contain atoms of carbon, hydrogen, and oxygen, and optionally, nitrogen and the halogens. Oxygen or nitrogen atoms or both are generally present in ether, ester, urethane, amide, and urea groups. Ethylenically unsaturated compounds may have a molecular weight of less than about 4,000 and may be esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like. Representative examples of acrylate resins include methyl methacrylate, ethyl methacrylate styrene, divinylbenzene, vinyl toluene, acrylamide, methylacrylamide, N-methylacrylamide, N,N-dimethylacrylamide, N-vinylpyrrolidone, and N-vinylpiperidone.

The aminoplast resins have at least one pendant $\alpha,\beta$-unsaturated carbonyl group per molecule or oligomer. These unsaturated carbonyl groups can be acrylate, methacrylate, or acrylamide type groups. Examples of such materials include N-(hydroxymethyl) acrylamide, N,N'-oxydimethylenebisacrylamide, ortho- and para-acrylamidomethylated phenol, acrylamidomethylated phenolic novolac, and combinations thereof. These materials are further described in U.S. Pat. Nos. 4,903,440 and 5,236,472 both incorporated herein by reference.

Isocyanurate derivatives having at least one pendant acrylate group and isocyanate derivatives having at least one pendant acrylate group are further described in U.S. Pat. No. 4,652,274 incorporated herein after by reference. The isocyanurate material may be a triacrylate of tris(hydroxy ethyl) isocyanurate.

Epoxy resins have an oxirane and are polymerized by the ring opening. Such epoxide resins include monomeric epoxy resins and oligomeric epoxy resins. Examples of some useful epoxy resins include 2,2-bis[4-(2,3-epoxypropoxy)-phenyl propane] (diglycidyl ether of Bisphenol) and commercially available materials under the trade designations "Epon 828", "Epon 1004", and "Epon 1001F" available from Shell Chemical Co., Houston, Tex., "DER-331", "DER-332", and "DER-334" available from Dow Chemical Co., Freeport, Tex. Other suitable epoxy resins include glycidyl ethers of phenol formaldehyde novolac (e.g., "DEN-431" and "DEN-428" available from Dow Chemical Co.). Epoxy resins useful in the invention can polymerize via a cationic mechanism with the addition of an appropriate cationic curing agent. Cationic curing agents generate an acid source to initiate the polymerization of an epoxy resin.

In some embodiments the coating precursor solution may further comprise a free radical curing agent. However in the case of an electron beam energy source, the curing agent is not always required because the electron beam itself generates free radicals. Examples of free radical thermal initiators include peroxides, e.g., benzoyl peroxide, azo compounds, benzophenones, and quinones. For either ultraviolet or visible light energy source, this curing agent is sometimes referred to as a photoinitiator. Examples of initiators, that when exposed to ultraviolet light generate a free radical source, include but are not limited to organic peroxides, azo compounds, quinones, and benzophenones. Examples of initiators that when exposed to visible radiation generate a free radical source can be found in U.S. Pat. No. 4,735,632, incorporated herein by reference. The initiator for use with visible light may be that known under the trade designation "Irgacure 369" commercially available from Ciba Specialty Chemicals, Tarrytown, N.Y.

Second Component

The second component functions to dissolve when exposed to the wellbore conditions in a user controlled fashion, i.e., at a rate and/or location controlled by the structure of the first component. In this way, zones in a wellbore, or the wellbore itself or branches of the wellbore, may be blocked for periods of time uniquely defined by the user. Further, the second component may be used to deliver controlled amounts of chemicals useful in wellbore fracturing in similar fashion to controlled release pharmaceuticals.

Materials useful in the second component include water-soluble materials selected from water-soluble inorganic materials, water-soluble organic materials, and combinations thereof. Suitable water-soluble organic materials may be water-soluble natural or synthetic polymers or gels. The water-soluble polymer may be derived from a water-insoluble polymer made soluble by main chain hydrolysis, side chain hydrolysis, or combination thereof, when exposed to a weakly acidic environment. Furthermore, the term "water-soluble" may have a pH characteristic, depending upon the particular polymer used.

Suitable water-insoluble polymers which may be made water-soluble by acid hydrolysis of side chains include those selected from polyacrylates, polyacetates, and the like and combinations thereof.

Suitable water-soluble polymers or gels include those selected from polyvinyls, polyacrylics, polyhydroxyacids, and the like, and combinations thereof.

Suitable polyvinyls include polyvinyl alcohol, polyvinyl butyral, polyvinyl formal, and the like, and combinations thereof. Polyvinyl alcohol is available from Celanese Chemicals, Dallas, Tex., under the trade designation Celvol. Individual Celvol polyvinyl alcohol grades vary in molecular weight and degree of hydrolysis. Molecular weight is generally expressed in terms of solution viscosity. The viscosities are classified as ultra low, low, medium and high, while degree of hydrolysis is commonly denoted as super, fully, intermediate and partially hydrolyzed. A wide range of standard grades is available, as well as several specialty grades, including polyvinyl alcohol for emulsion polymerization, fine particle size and tackified grades. Celvol 805, 823 and 840 polyvinyl alcohols are improved versions of standard polymerization grades—Celvol 205, 523 and 540 polyvinyl alcohols, respectively. These products offer a number of advantages in emulsion polymerization applications including improved water solubility and lower foaming. Polyvinyl butyral is available from Solutia Inc. St. Louis, Mo., under the trade designation BUTVAR. One form is Butvar Dispersion BR resin, which is a stable dispersion of plasticized polyvinyl butyral in water. The plasticizer level is at 40 parts per 100 parts of resin. The dispersion is maintained by keeping pH above 8.0, and may be coagulated by dropping the pH below this value. Exposing the coagulated version to pH above 8.0 would allow the composition to disperse, thus affording a control mechanism for the second component.

Suitable polyacrylics include polyacrylamides and the like and combinations thereof, such as N,N-disubstituted polyacrylamides, and N,N-disubstituted polymethacrylamides. A detailed description of physico-chemical properties of some of these polymers are given in, "Water-Soluble Synthetic Polymers: Properties and Behavior", Philip Molyneux, Vol. I, CRC Press, (1983) included herein by reference.

Suitable polyhydroxyacids may be selected from polyacrylic acid, polyalkylacrylic acids, interpolymers of acrylamide/acrylic acid/methacrylic acid, combinations thereof, and the like.

Adhesion Promoters, Coupling Agents and Other Optional Ingredients

For embodiments wherein a better bond between the first and second components, or between the these components and a protective layer is desired, mechanical and/or chemical adhesion promotion (priming) techniques may used. For example, if the first component is a thermoplastic polycarbonate, polyetherimide, polyester, polysulfone, or polystyrene material, use of a primer may be preferred to enhance the adhesion between the this material and the second component, and any coating. The term "primer" as used in this context is meant to include mechanical, electrical and chemical type primers or priming processes. Examples of mechanical priming processes include, but are not limited to, corona treatment and scuffing, both of which increase the surface area of the first component. An example of a preferred chemical primer is a colloidal dispersion of, for example, polyurethane, acetone, isopropanol, water, and a colloidal oxide of silicon, as taught by U.S. Pat. No. 4,906,523, which is incorporated herein by reference.

First components of the invention that are polymeric may include, in addition to the polymeric material, an effective amount of a fibrous reinforcing material. Herein, an "effective amount" of a fibrous reinforcing material is a sufficient amount to impart at least improvement in the physical characteristics of the first component, i.e., hydrocarbon resistance, toughness, flexibility, stiffness, shape control, adhesion, etc., but not so much fibrous reinforcing material as to give rise to any significant number of voids and detrimentally affect the structural integrity of the first component during use. The amount of the fibrous reinforcing material in the first component may be within a range of about 1-40 percent, or within a range of about 5-35 percent, or within a range of about 15-30 percent, based upon the weight of the first component.

The fibrous reinforcing material may be in the form of individual fibers or fibrous strands, or in the form of a fiber mat or web. The mat or web can be either in a woven or nonwoven matrix form. Examples of useful reinforcing fibers in applications of the present invention include metallic fibers or nonmetallic fibers. The nonmetallic fibers include glass fibers, carbon fibers, mineral fibers, synthetic or natural fibers formed of heat resistant organic materials, or fibers made from ceramic materials.

By "hydrocarbon resistant" organic fibers, it is meant that useable organic fibers must be resistant to, or resistant to breaking down, under the wellbore conditions. Examples of useful natural organic fibers include wool, silk, cotton, or cellulose. Examples of useful synthetic organic fibers include polyvinyl alcohol fibers, polyester fibers, rayon fibers, polyamide fibers, acrylic fibers, aramid fibers, or phenolic fibers. Generally, any ceramic fiber is useful in applications of the present invention. An example of a ceramic fiber suitable for the present invention is "Nextel" which is commercially available from 3M Co., St. Paul, Minn. Glass fibers may be used, at least because they impart desirable characteristics to the inventive well operating elements and are relatively inexpensive. Furthermore, suitable interfacial binding agents exist to enhance adhesion of glass fibers to thermoplastic materials, such as a silane coupling agents, to improve the adhesion to the thermoplastic material. Examples of silane coupling agents include "Z-6020" and "Z-6040," available from Dow Corning Corp., Midland, Mich.

Polymeric first components, if polymeric materials are used, may further include an effective amount of a toughening agent for certain applications. A primary purpose of the toughening agent is to increase the impact strength of the first component. By "an effective amount of a toughening agent" it is meant that the toughening agent is present in an amount to impart at least improvement in toughness without it becoming too flexible. The first components of the present invention may include sufficient toughening agent to achieve the desirable impact test values listed above. A first component of the present invention may contain between about 1 percent and about 30 percent of the toughening agent, based upon the total weight of the first component. For example, the less elastomeric characteristics a toughening agent possesses, the larger quantity of the toughening agent may be required to impart desirable properties to the well operating elements of the present invention. Toughening agents that impart desirable stiffness characteristics to the first component of the present invention include rubber-type polymers and plasticizers. Of these, the rubber toughening agents may be mentioned, and synthetic elastomers. Examples of useful preferred toughening agents, i.e., rubber tougheners and plasticizers, include: toluenesulfonamide derivatives (such as a mixture of N-butyl- and N-ethyl-p-toluenesulfonamide, commercially available from Akzo Chemicals, Chicago, Ill., under the trade designation "Ketjenflex 8"); styrene butadiene copolymers; polyether backbone polyamides (commercially available from Atochem, Glen Rock, N.J., under the trade designation "Pebax"); rubber-polyamide copolymers (commercially available from DuPont, Wilmington, Del., under the trade designation "Zytel FN"); and functionalized triblock polymers of styrene-(ethylene butylene)-styrene (commercially available from Shell Chemical Co., Houston, Tex., under the trade designation "Kraton FG1901"); and mixtures of these materials. Of this group, rubber-polyamide copolymers and styrene-(ethylene butylene)-styrene triblock polymers may be used, at least because of the beneficial characteristics they impart to the first component. Rubber-polyamide copolymers may also be used, at least because of the beneficial impact characteristics they impart to the first component of the present invention. Commercial compositions of toughener and thermoplastic material are available, for example, under the designation "Ultramid" from BASF Corp., Parsippany, N.J. Specifically, "Ultramid B3ZG6" is a nylon resin containing a toughening agent and glass fibers that is useful in the present invention. Besides the materials described above, if the first components are polymeric materials, they may include effective amounts of other materials or components depending upon the end properties desired. For example, the first component may include a shape stabilizer, i.e., a thermoplastic polymer with a melting point higher than that described above for the thermoplastic material. Suitable shape stabilizers include, but are not limited to, poly(phenylene sulfide), polyimides, and polyaramids. An example of a preferred shape stabilizer is polyphenylene oxide nylon blend commercially available from GE Plastics, Pittsfield, Mass., under the trade designation "Noryl GTX 910."

Other materials that may be added to polymeric first components (and second components) for certain applications of the present invention include inorganic or organic fillers. Inorganic fillers are also known as mineral fillers. A filler is defined as a particulate material, typically having a particle size less than about 100 micrometers, preferably less than about 50 micrometers. Examples of useful fillers for applications of the present invention include carbon black, calcium carbonate, silica, calcium metasilicate, cryolite, phenolic fillers, or polyvinyl alcohol fillers. If a filler is used, it is theorized that the filler fills in between the reinforcing fibers and may prevent crack propagation through the first or second component. Typically, a filler would not be used in an amount greater than about 20 percent, based on the weight of the first or second component. Preferably, at least an effective amount of filler is used. Herein, the term "effective amount" in this context refers to an amount sufficient to fill but not significantly reduce the tensile strength of the hardened first or second component.

Other useful materials or components that may be added to the first and second components for certain applications of the present invention include, but are not limited to, oils, antistatic agents, flame retardants, heat stabilizers, ultraviolet stabilizers, internal lubricants, antioxidants, and processing aids. One would not typically use more of these components than needed for desired results.

Herein, the term "coupling agent" includes mixtures of coupling agents. An example of a coupling agent that may be found suitable for this invention is gamma-methacryloxypropyltrimethoxy silane known under the trade designation "Silquest A-174" from GE Silicones, Wilton, Conn. Other suitable coupling agents are zircoaluminates, and titanates, and the above-mentioned silane coupling agents "Z-6020" and "Z-6040," available from Dow Corning Corp., Midland, Mich.

Well Operating Elements

FIGS. 1-8 illustrate several non-limiting well operating element embodiments of the invention. FIGS. 1A, 1B, and 1C illustrate schematic cross-sectional views of three well operating element embodiments 10, 20, and 30, respectively designed for deployment in a wellbore within a geological formation. Embodiment 10 is a ball-shaped well operating element having a first component 12 and a second component 14, with a single exposure hole 16 adapted to expose component 14 to well bore fluid. Exposure hole 16 is illustrated exaggerated in length and diameter for purposes of illustration. Embodiment 20 is an elongated ball-shaped element, also having a first component 12 and a second component 14, with three exposure holes 16 adapted to expose component 14 to well bore fluid. Three exposure holes 16 are illustrated, with two of the holes having shorter length than a third hole. Elongated ball 20 has first and second ends hemispherical ends 15 and 17, respectively, and a cylindrical middle section 18. Embodiment 30 is a dart embodiment, again having first component 12 and second component 14, with five exposure holes 16 of varying length. Embodiment 30 has a hemispherical section 32 that would be the first end in the wellbore, and a conical section 34. Sections 32 and 34 are joined at a junction 36 which may vary in diameter. In each of embodiments 10, 20, and 30, exposure holes 16 could be tortuous holes, and are illustrated as straight for convenience only.

Figure 1:
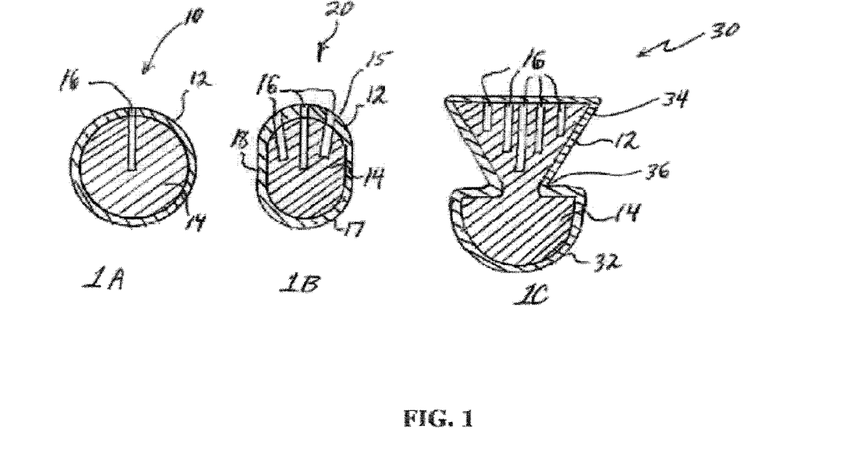
FIGS. 1, 7, and 8 are diagrammatical cross-sectional views of various exemplary well operating elements of the invention.
Figure 2:
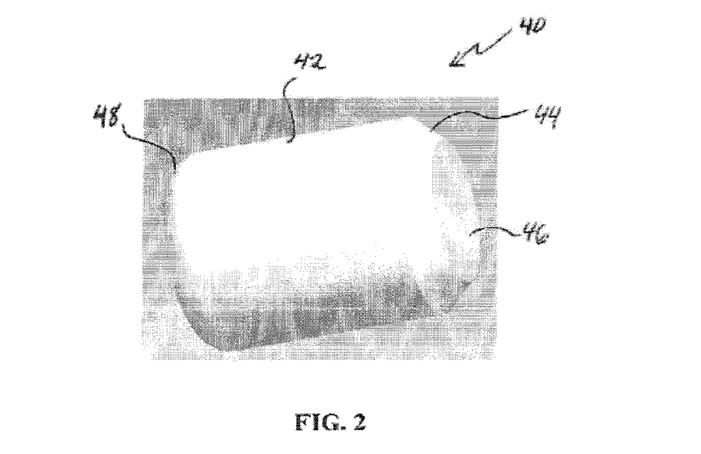
FIGS. 2-6 are schematic perspective views of other embodiments of well operating elements in accordance with the invention.

FIG. 2 illustrates a schematic perspective view of another well operating element embodiment 40 of the invention. Embodiment 40 includes a cylindrical section 42, a short conical section 44, and a flat lead end 46 (end which would be first when flowed in a well bore), and a rear end 48, curved to provide a streamlined flow. Illustrated is only the first component; the second component is almost entirely covered by the first component, save for one or more exposure holes that may be positioned in rear end 48, and are not illustrated in FIG. 2.

Figure 3:
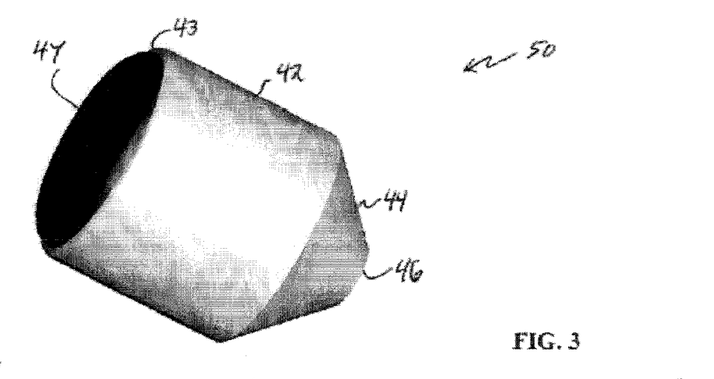

FIG. 3 illustrates a schematic perspective view of another well operating element embodiment 50 of the invention. Embodiment 50 includes a cylindrical section 42, a conical section 44, and a flat lead end 46 (end which would be first when flowed in a well bore). Cylindrical section 42 has, in this embodiment, an end 47, which may be as illustrated, or may be closer to conical section 44 if desired depending on the degree of exposure desired for second component 47. Exposed second component 47 and end 43 may be streamlined as illustrated.

Figure 4A:
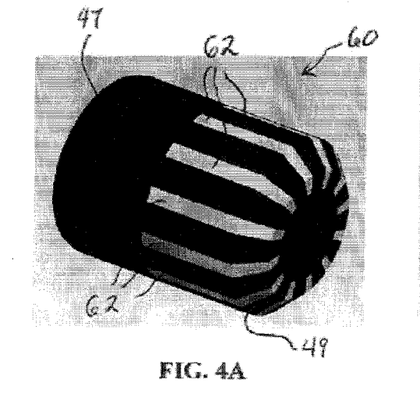
Figure 4B:
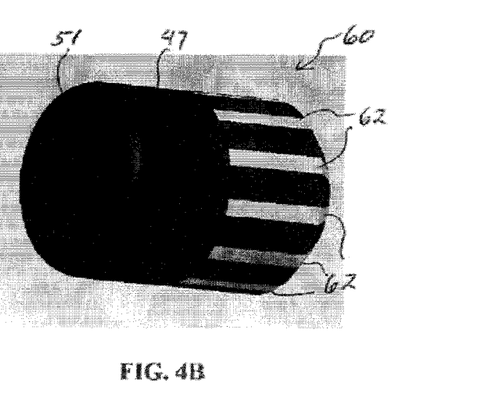

FIGS. 4A and 4B illustrate two schematic perspective views of another well operating element embodiment 60 of the invention. FIG. 4A illustrates generally a forward port perspective view, while FIG. 4B is an aft port view, using marine terminology. In embodiment 60, the overall shape of the well operating element is similar to embodiment 40 of FIG. 2, although this is not required. Embodiment 60 includes a large, exposed second component 47, 49, and 51 covered in certain front and side locations by strips 62 of first component material, which may be the same or different from strip to strip.

Figure 5A:
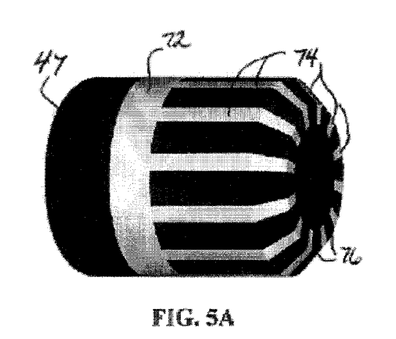
Figure 5B:
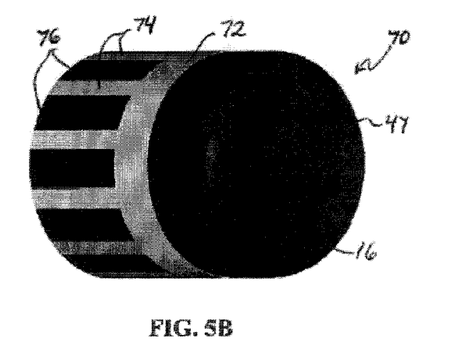

FIGS. 5A and 5B illustrate two schematic perspective views of another well operating element embodiment 70 of the invention. These figures illustrate a collet 72 of first component having a plurality of supports arms 74 extending therefrom, which serve to support and hold portions 76 of second component 47 in place until they are dissolved. Embodiment 70 may also include one or more exposure holes 16 in the second component, although this is optional.

Figure 6:
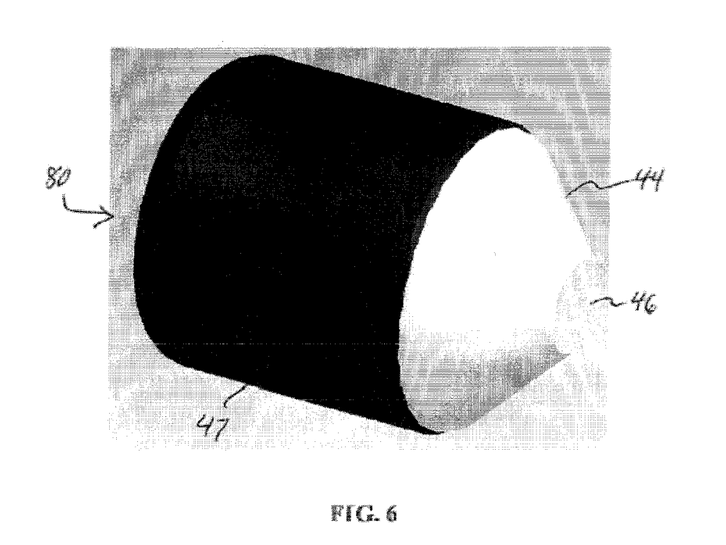

FIG. 6 is a perspective view of another well operating element embodiment 80 of the invention, which is similar to embodiment 50 of FIG. 3, except that more of the second component 47 is exposed, illustrating one of many mechanisms of controlling the dissolvability of the second material. First component 44 and 46 may be a hollow cap, or it may be a placed directly in contact with second component. In other words, second component 47 may have a conical section and flat end corresponding substantially with conical section 44 and flat end 46 of the first component.

Figure 7A:
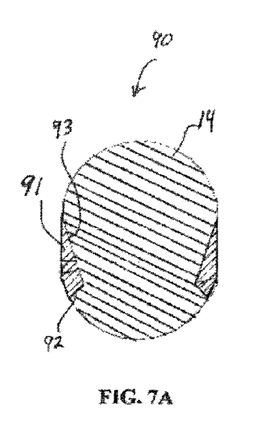
Figure 7B:
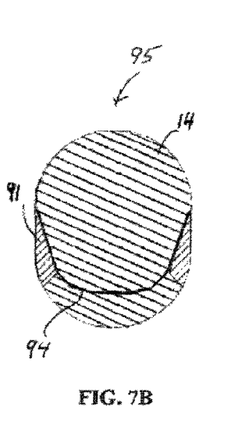
Figure 8:
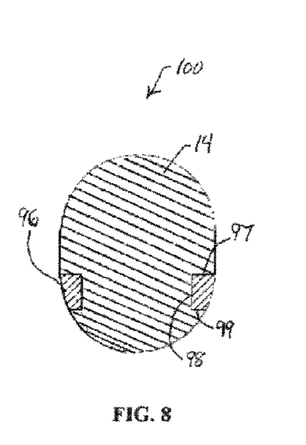

FIGS. 7A, 7B, and 8 illustrate cross-sectional views of three more embodiments 90, 95, and 100, respectively, of well operating elements of the invention, all three embodiments being elongated balls, but these embodiments are merely exemplary. Embodiment 90 of FIG. 7A illustrates are large portion 14 of second component, and an embedded, conical first component 91 having interfaces 92 and 93 with second component 14. This arrangement of first and second components affords another mechanical mechanism to control the dissolvability of the second component. Embodiment 95 of FIG. 7B adds a layer of fabric material 94, such as that known under the trade designation Kevlar, available from Dupont, Wilmington, Del., for adding structural integrity. Embodiment 100 of FIG. 8 illustrates an embodiment wherein a flat washer-like piece of first component 96 is used to restrict the dissolvability of second component 14. Interfaces 97, 98, and 99 afford structural stability and contact between first component 96 and second component 14. A layer of material, such layer 94 in FIG. 7B, may be used in this embodiment as well.

Well operating elements of the invention may include many optional items. One optional feature may be one or more sensors located in the first or second component to detect the presence of hydrocarbons (or other chemicals of interest) in the zone of interest. The chemical indicator may communicate its signal to the surface over a fiber optic line, wire line, wireless transmission, and the like. When a certain chemical or hydrocarbon is detected that would present a safety hazard or possibly damage a downhole tool if allowed to reach the tool, the element may act or be commanded to close a valve before the chemical creates a problem.

In summary, generally, this invention pertains primarily to well operating elements comprising a first component and a second component as described herein, and optionally a protective coating, which may be conformal, on the outside surface of the either or both components. One useful protective coating embodiment is a Parylene coating. Parylene forms an almost imperceptible plastic conformal coating that protects materials from many types of environmental problems. Any process and monomer (or combination of monomers, or prepolymer or polymer particulate or solution) that forms a polymeric coating may be used. Examples of other methods include spraying processes (e.g. electrospraying of reactive monomers, or non-reactive resins); sublimation and condensation; and fluidized-bed coating, wherein, a single powder or mixture of powders which react when heated may be coated onto a heated substrate, and the powder may be a thermoplastic resin or a thermoset resin.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A wellbore system comprising:
   a tubular member for being located in a wellbore;
   an inner surface of the tubular member;
   a seat extending from an inner surface of the tubular member at a first location within the tubular member;
   a wellbore element configured to be dropped into a wellbore and engage the seat to provided a fluid barrier to prevent fluid flow therepast;
   process fluids pumpable into the tubular member having a temperature less than a wellbore temperature;
   a first component of the wellbore element that is non-dissolvable when exposed to a selected wellbore environment; and
   a second component of the wellbore element that is soluble in the selected wellbore environment and has location of dissolution at least partially controlled by the first component, the second component selected to dissolve at a first rate when exposed to the temperature of the process fluids and dissolve at a second rate faster than the first rate when exposed to the wellbore temperature.

2. The system of claim 1 wherein the first component comprises a coating, covering, or sheath upon a portion of an outer surface of the second component.

3. The system of claim 1 wherein the first component includes one or more exposure holes adapted to expose the second component.

4. The system of claim 1 wherein the first component is embedded in the second component.

5. The system of claim 1 wherein the first component is selected from polymeric materials, metals that do not melt in the wellbore environment, materials soluble in acidic compositions, frangible ceramic materials, and composites thereof.

6. The system of claim 5 wherein the first component comprises a polymeric material selected from natural polymers, synthetic polymers, blends of natural and synthetic polymers, and layered versions of polymers, wherein individual layers may be the same or different in composition and thickness.

7. The system of claim 1 wherein the selected wellbore environment comprises water and the second component comprises a water-soluble material.

8. The system of claim 7 wherein the water-soluble material is selected from water-soluble inorganic materials, water-soluble organic materials, and combinations thereof.

9. The system of claim 8 wherein the water-soluble organic material is a water-soluble natural or synthetic polymer or gel.

10. The system of claim 9 wherein the water-soluble polymer or gel is selected from polyvinyls, polyacrylics, polyhydroxyacids, and combinations thereof.

11. The system of claim 10 wherein the water-soluble polymer or gel is selected from polyvinyl alcohol, polyvinyl butyral, polyvinyl formal, polyacrylamides, polyacrylic acid, polyalkylacrylic acids, interpolymers of acrylamide/acrylic acid/methacrylic acid, and combinations thereof.

12. The system of claim 1 having a shape selected from cylindrical, round, bar, and dart.

13. The system of claim 12 wherein the first component is a coating, covering, or sheath entirely covering the second component, and the first component comprises one or more exposure holes to allow well fluids or injected fluids to contact the second component.

14. The system of claim 13 wherein at least one of the exposure holes extends into the second component, the exposure hole having a length and diameter.

15. The system of claim 1 wherein the first component comprises a plurality of strips of the first material adhered to an outer surface of the second component.

16. A wellbore system comprising:
    a tubular member configured to be located within a wellbore;
    an inner surface of the tubular member;
    a seat of the tubular extending from the inner surface thereof;
    a well operating element for being placed within the tubular member for use in the wellbore and for being exposed to wellbore fluids;
    a body of the welloperating element for cooperating with a seat within the wellbore to block flow of wellbore fluids therepast;
    an outer surface of the body for being exposed to wellbore fluids;
    an interior portion of the body positioned below the outer surface;
    a soluble component of the interior portion that is soluble in a selected wellbore environment; and
    an opening extending through the outer surface of the body and into the soluble component of the interior portion to provided a location of dissolution along the opening below the outer surface.

17. The system of claim 16 wherein the outer surface includes a non-soluble component of the outer surface at least partially covering the soluble component of the interior portion to limit the location of dissolution of the soluble component.

18. The system of claim 17 wherein the non-soluble component comprises a collet embedded in the second component.

19. The system of claim 1, wherein the location of dissolution is disposed at an upper end of the first component.

20. The system of claim 1, wherein the location of dissolution is disposed at a lower end of the first component.

21. The system of claim 1, wherein the second component has a rate of dissolution at least partially controlled by the first component.

22. The system of claim 1, wherein the first component is disposed about the second component.

23. The system of claim 1, wherein the exposure holes are at least partially disposed within the second component.

* * * * *